(No Model.) F. H. RICHARDS. 6 Sheets—Sheet 1.
WEIGHING MACHINE.

No. 589,281. Patented Aug. 31, 1897.

Witnesses
Chas. F. Schmelz
Fred. J. Dole.

Inventor
F. H. Richards (No Model.) 6 Sheets—Sheet 4.

F. H. RICHARDS.
WEIGHING MACHINE.

No. 589,281. Patented Aug. 31, 1897.

Witnesses
Chas. H. Schmelz
Fred. J. Dole.

Inventor
F. H. Richards (No Model.) 6 Sheets—Sheet 5.

F. H. RICHARDS.
WEIGHING MACHINE.

No. 589,281. Patented Aug. 31, 1897.

Witnesses
Chas. F. Schmelz
Fred. J. Dole.

Inventor
F. H. Richards (No Model.)  6 Sheets—Sheet 6.

F. H. RICHARDS.
WEIGHING MACHINE.

No. 589,281.  Patented Aug. 31, 1897.

Witnesses
Chas. F. Schmelz
Fred. J. Dole

Inventor
F. H. Richards

UNITED STATES PATENT OFFICE.

FRANCIS H. RICHARDS, OF HARTFORD, CONNECTICUT.

WEIGHING-MACHINE.

SPECIFICATION forming part of Letters Patent No. 589,281, dated August 31, 1897.

Application filed May 24, 1897. Serial No. 637,921. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing-Machines, of which the following is a specification.

This invention relates to weighing-machines for weighing and delivering various classes of granular and similar substances, certain of the improvements being especially intended for application to machines of the kind disclosed by Letters Patent No. 572,067, granted to me November 24, 1896.

One of the objects of the invention is to provide, in connection with the load-reducing means of the machine, a receptacle, preferably oscillatory, one of the chambers of which is adapted to receive the surplus removed from the load-receiver during the weighing of a load, said receptacle being operated by means controlled by the weighing mechanism and also having a cut-off which in the present instance is stationary.

Another object of the invention is to provide, in connection with the load-receiver, a closer mounted for bodily reciprocatory movement relatively to the load-receiver and means for rotating the closer, whereby the load-receiver can be emptied with rapidity. In the present instance the closer consists of a plate connected with the load-receiver and vertically reciprocatory, it being given a partial rotation on each stroke, whereby it is presented substantially edgewise to the outgoing material from the load-receiver, the flowing material being adapted to clean the opposite sides of the closer.

Figure 1:
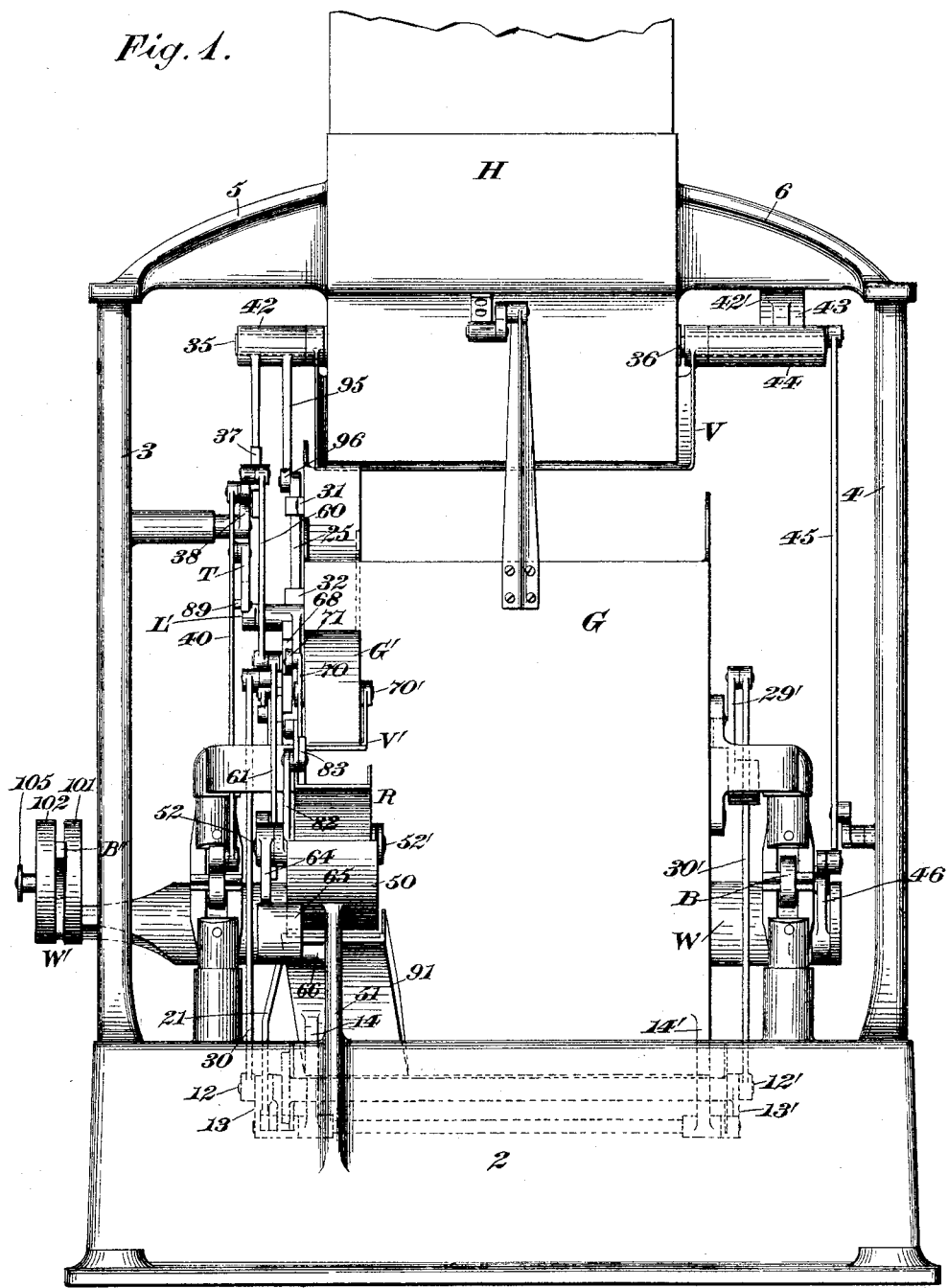
Figure 2:
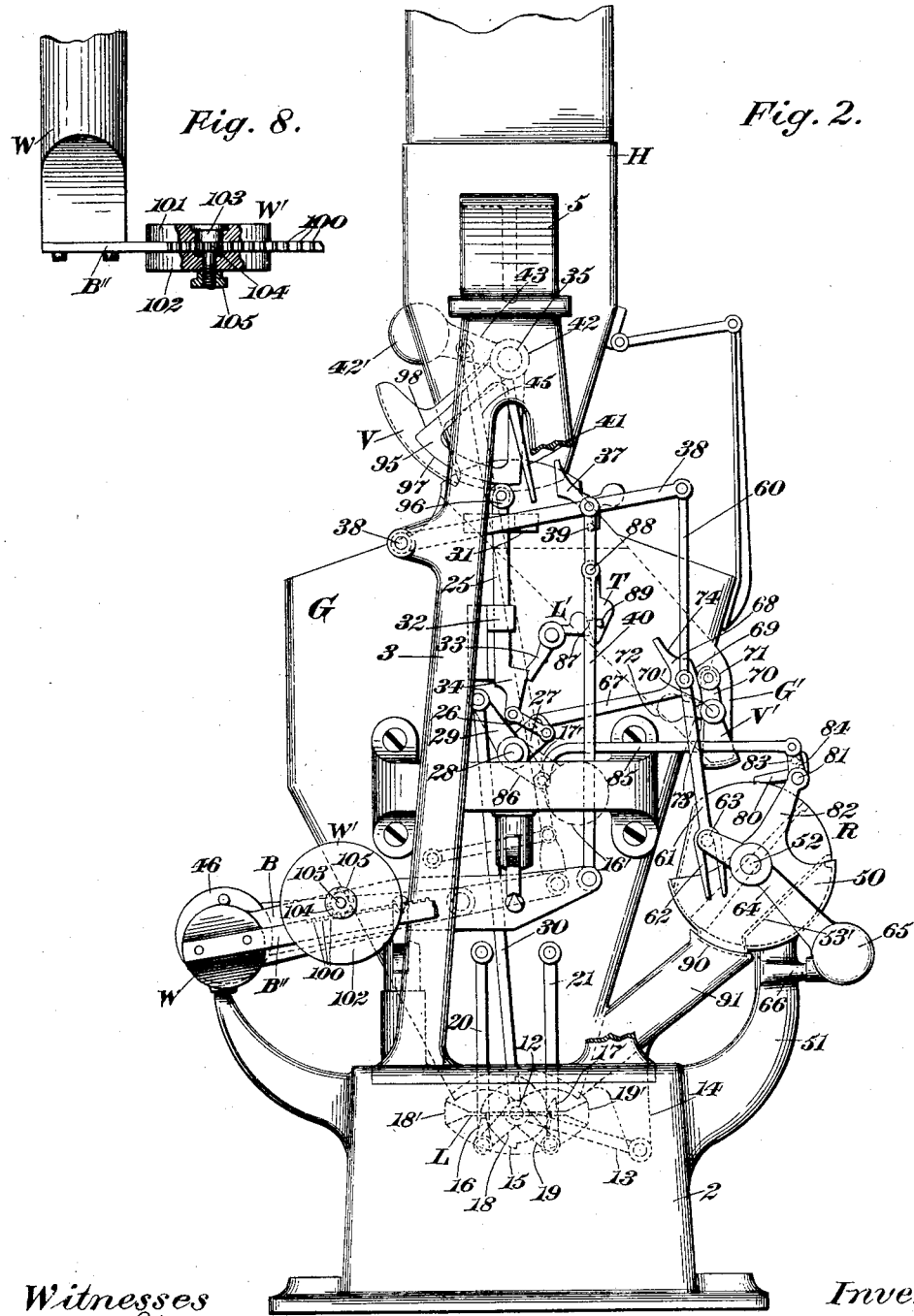
Figure 3:
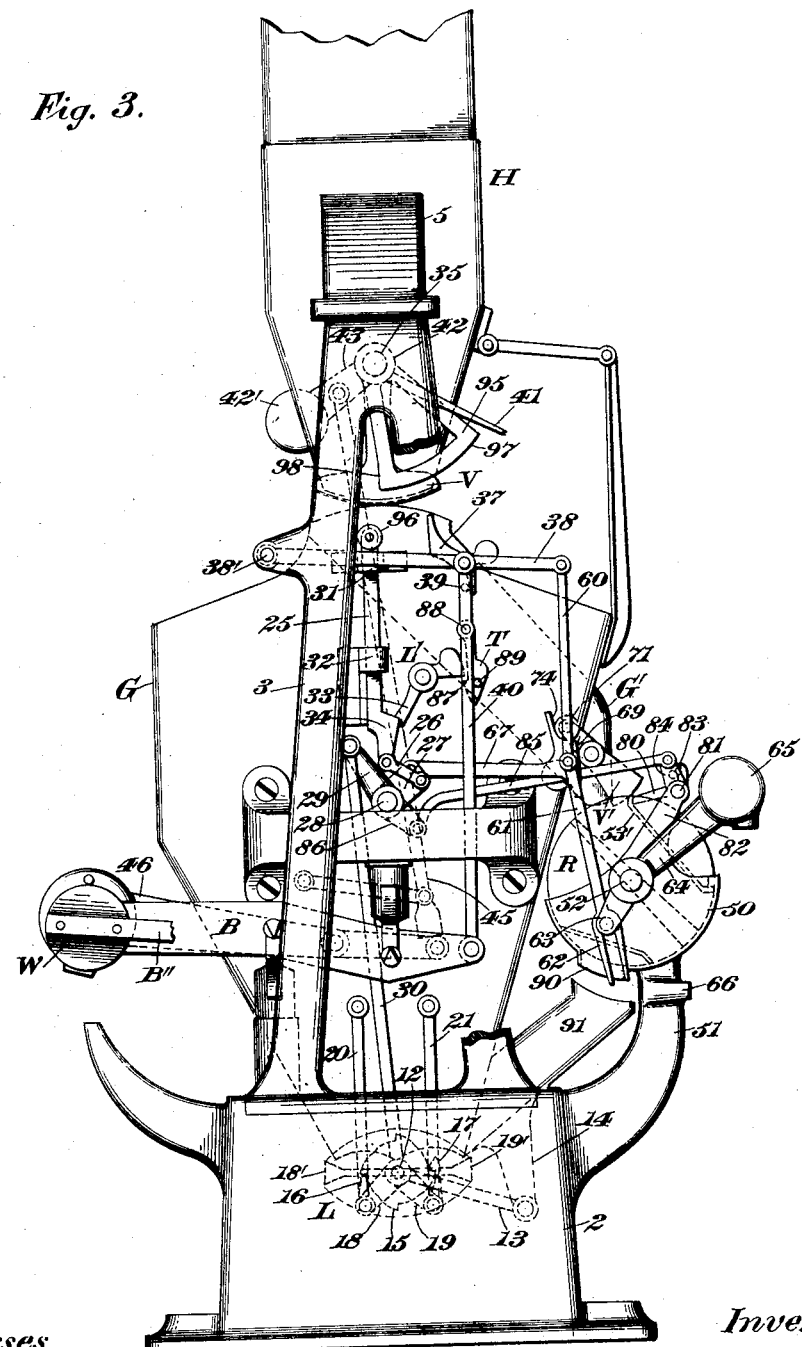
Figure 4:
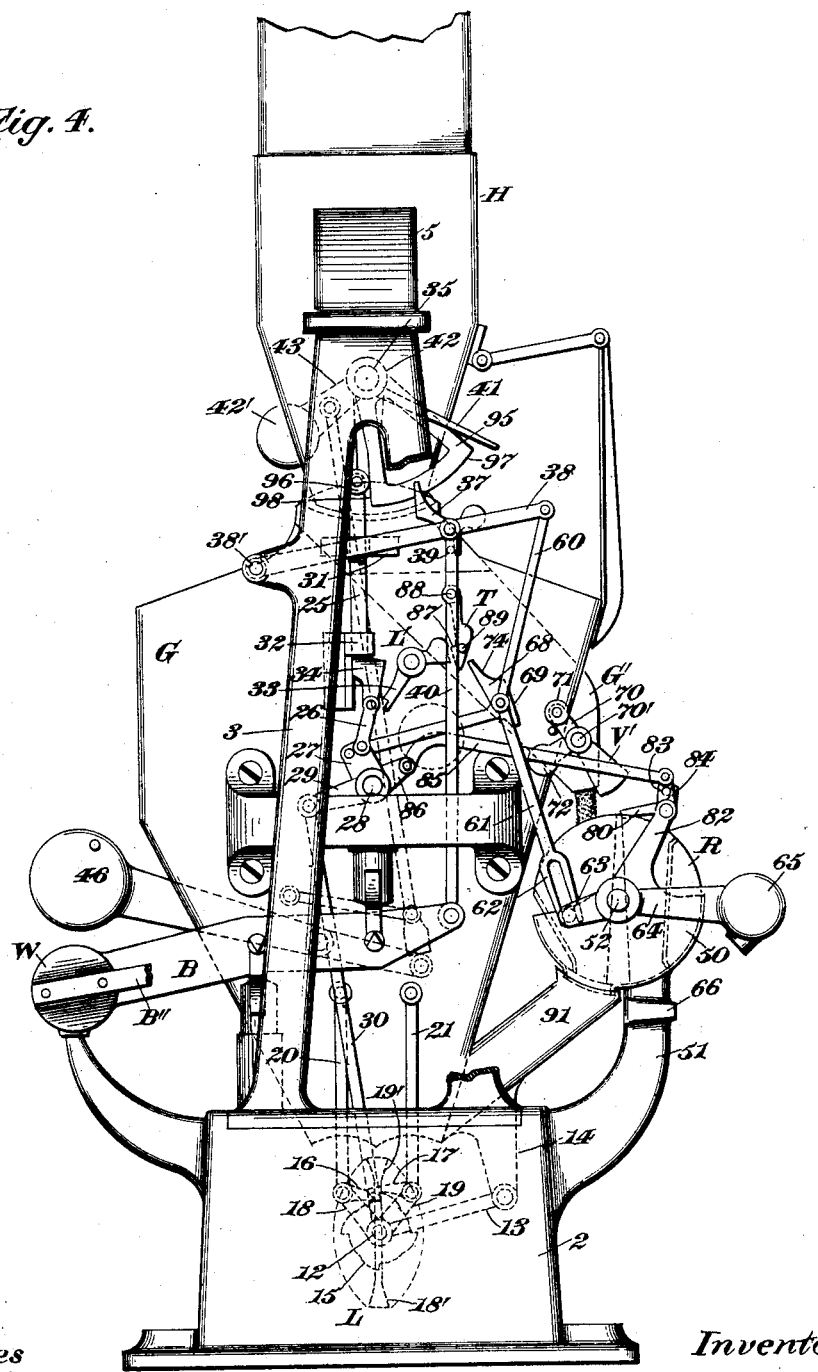
Figure 5:
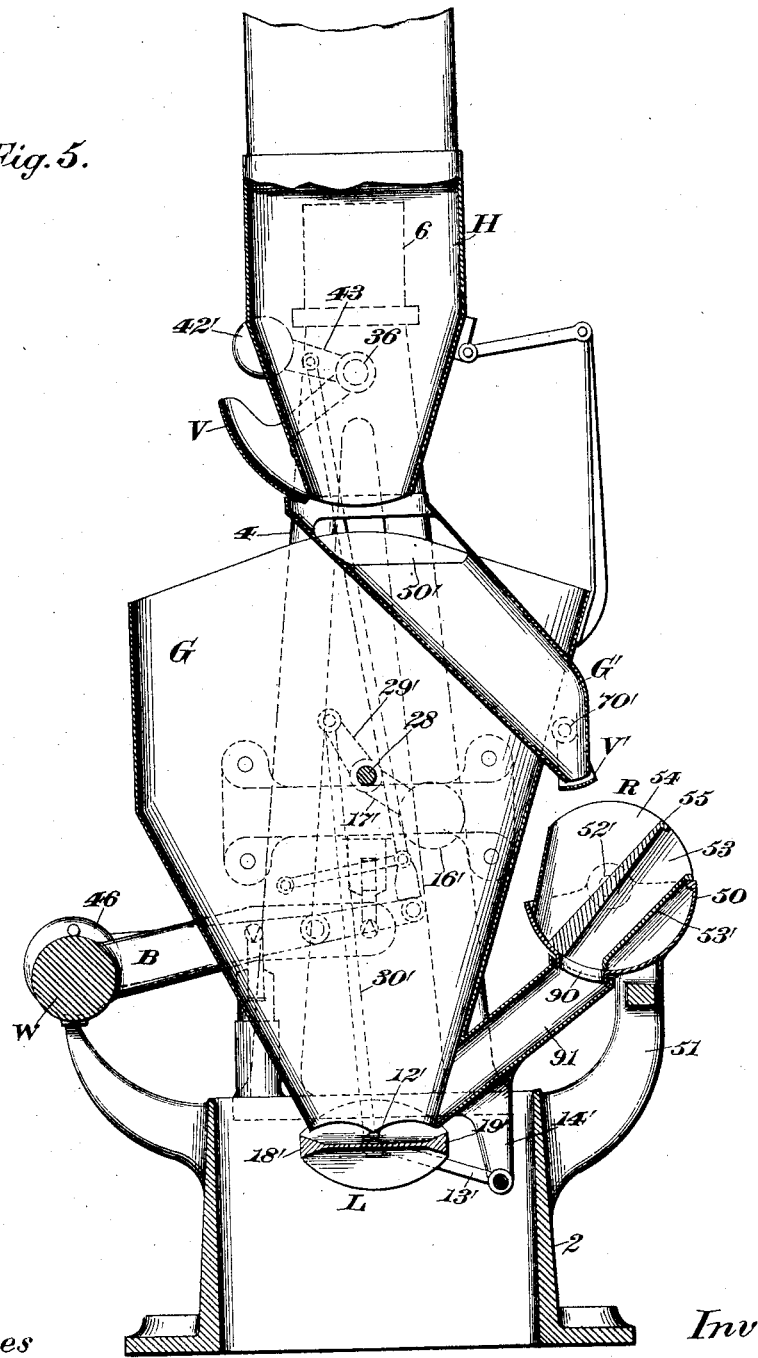
Figure 7:
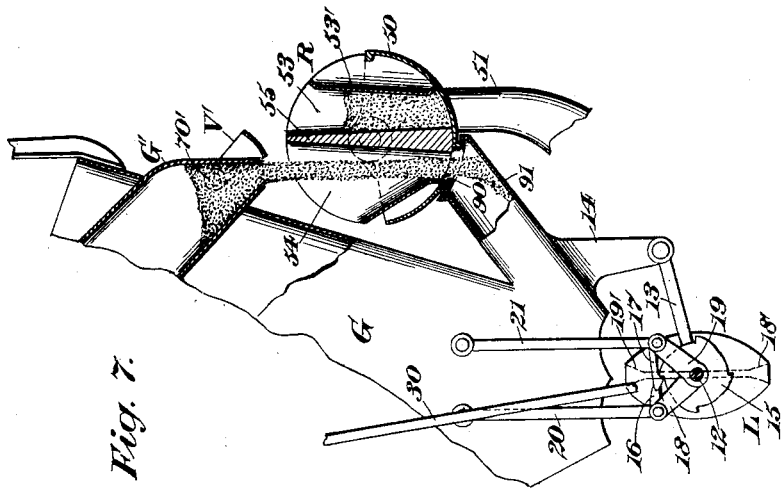
Figure 6:
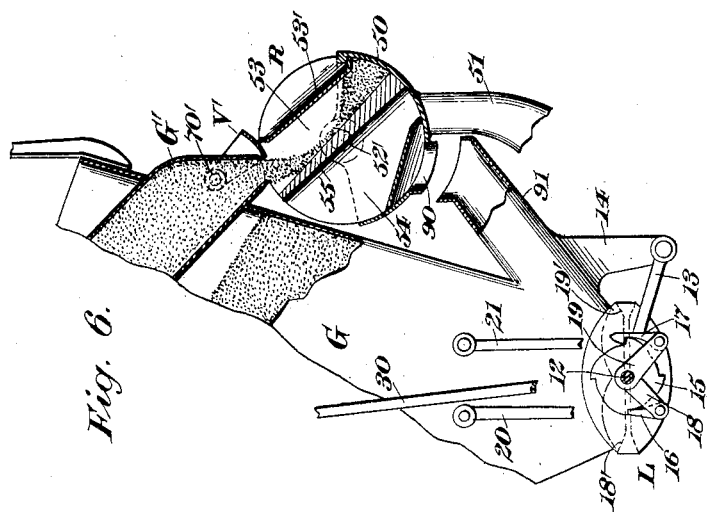

In the drawings accompanying and forming part of this specification, Figure 1 is a front elevation of my improved weighing-machine. Figs. 2, 3, and 4 are side elevations of the machine as seen from the left in Fig. 1, showing the positions occupied by the parts during a cycle of movements. Fig. 5 is a longitudinal central section of the machine. Figs. 6 and 7 are side elevations of the load-reducing means and the receptacle for receiving the surplus, the closer being also shown in said figures in its two positions. Fig. 8 is a detail in sectional plan of an auxiliary beam and an adjustable weight thereon.

Similar characters designate like parts in all the figures of the drawings.

The framework for sustaining the various parts of the machine may be of any suitable or preferred construction, it consisting in the present case of the chambered supporting base or bed 2, the side frames 3 and 4, rising therefrom, and the brackets 5 and 6, extending oppositely from the supply-hopper H, said parts being secured together in some convenient manner.

The weighing mechanism may be of any suitable type. It is represented comprising a load-receiver, as G, and a supporting scale-beam, as B, therefor. The load-receiver G is suspended from the poising end of the beam B, and the latter is pivotally mounted on the framework, both features of construction being substantially the same as shown in the Letters Patent hereinbefore referred to.

The load-receiver G has the usual discharge-outlet, which is preferably located in the lower end thereof, the outlet being covered, normally, by a suitable closer, as L, consisting of a plate supported for bodily reciprocatory movement, preferably in a vertical path, means being preferably provided to rotate the closer through a predetermined angle, whereby it will be presented substantially edgewise to the discharging stream of material from the load-receiver, as indicated in Figs. 4 and 7, so that the contents of the load-receiver can be discharged with facility.

The closer L, which is rotary about a horizontal axis, has preferably centrally at each end thereof the trunnions or pivots 12 and 12', working in bearings formed at the inner ends of the guide-arms 13 and 13', pivoted to suitable brackets, as 14 and 14', depending from opposite sides of the load-receiver.

Means are furnished for imparting a step-by-step rotative movement to the closer L, the latter being given a turn through a quarter of a circle at each intermittent operation, whereby it is presented to the outflowing mass from the load-receiver in an edgewise position, so that the load can quickly run from the receiver G, the material serving to clean the opposite faces of the closer of adhering matter.

The means illustrated for imparting the necessary step-by-step movement to the closer consists of pawl-and-ratchet mechanism. The ratchet is designated by 15, and it is suitably secured to the projecting trunnion 12, the coöperating pawls being designated by 16 and 17, respectively, and they are connected with a suitable resistance member, as the load-receiver G, whereby as the closer opens and shuts said pawls are rendered alternately effective partially to rotate the ratchet and consequently the closer.

The carrier for the pawl 16 is designated by 18, while the carrier for the pawl 17 is designated by 19, the two carriers being loosely mounted on the trunnion 12 and connected with the load-receiver G by the links 20 and 21, respectively, the links being pivoted to the respective parts. The closer being shut, as shown in Fig. 6, to cover the discharge-opening of the load-receiver, and being released at the proper stage in the operation it will be forced open and downward, whereby the several pivots of the arm 18 and link 20 and arm 19 and link 21 will be thrust into line, as represented in Fig. 7, whereby the pawl 16 being in contact with the working face of a tooth of the ratchet the latter, on the stroke of the closer, will be rotated through an angle of ninety degrees, and on the reverse or return stroke of the closer a similar rotation will be imparted to said closer through the agency of the pawl 17, acting against the ratchet, it being understood that the several links and arms described act as toggles, imparting a comparatively powerful stroke to the ratchet.

The means for shutting the closer consists of a counterweight 16', secured on the end of the arm 17', secured to the transverse rock-shaft 28. For the purpose of retarding the shutting movement of the closer the opposite ends thereof are enlarged and flattened, as at 18' and 19', the material acting against such flattened portions to accomplish the object sought.

The closer-holding means consists of a latch of ordinary construction counterweighted and designated by L', it being pivoted near the upper side of the load-receiver and in position to engage a suitable device, as the slide 25, coöperative with the closer, the slide being mounted on the load-receiver and having the link 26 pivoted thereto. Said link is likewise connected at its opposite end to the rocker 27 on the rock-shaft 28, journaled in and projecting beyond the opposite end walls of the load-receiver, said shaft having a crank-arm 29, to which is pivoted the link 30, loosely connected at its opposite end to the projecting trunnion 12 of the closer. The shaft 28 has at its opposite end a crank-arm 29', which is pivoted to the link 30', connected at its lower end with the trunnion 12'. The slide 25 is mounted for reciprocatory movement, and one of its functions is a blocking device for the stream-controller, it serving substantially as a lock-bolt for this purpose, as will hereinafter appear, and being preferably guided in its movement by the keepers or brackets 31 and 32, suitably secured to the load-receiver G. The shouldered arm 33 of the latch engages the offset 34 on the slide 25, and when these parts are disengaged it will be understood that the closer is released and can be forced downward and simultaneously rotated in the manner hereinbefore specified.

My present invention comprehends the provision of overloading and load-reducing means successively effective during the weighing of a load, the overloading means being adapted to deliver to the load-receiver an overcharge or supply of material in excess of the predetermined load, the surplus being subsequently removed by the load-reducing means.

The overloading means may be of any suitable form, it consisting in the present case of the supply-hopper H and the stream-controller or valve V, said valve being preferably maintained in its wide-open position for a sufficient length of time to permit a stream of comparatively large and uniform volume to enter the load-receiver to overcharge the same, part of the overload being delivered into an auxiliary receiver, such as G', transversely disposed to the main receiver.

The auxiliary load-receiver consists of a longitudinal conduit, the discharge end of which is preferably closed by a valve, as will hereinafter appear, and the inlet of which is disposed immediately below the hopper H to receive a part of the supply-stream. The valve V is shown as oscillatory, it being suspended by the pivots 35 and 36, respectively, extending outward from opposite sides of the hopper H. The valve V, as just stated, is normally maintained in its nearly wide-open position, the by-pass stop 37, of ordinary construction, being provided for this purpose, said stop being pivoted to the lever 38 and its motion being limited by a stop 39 on the link 40, pivoted, respectively, to the lever and to one arm of the scale-beam B. The inner end of the lever 38 is pivoted at 38' to the framework. The by-pass stop 37 is engaged by the depending rod 41, the hub 42 of which is secured to the valve-pivot 35, the by-pass being adapted to hold the rod, and consequently the valve, for a predetermined length of time or until the receiver G is overloaded.

In Fig. 2 the valve V is represented in its wide-open position and the rod 41 at one side of the coöperating by-pass 37, in which position the valve is held by the weighing mechanism. When a certain quantity of material has been received by the load-receiver, it will descend, thereby permitting the valve to close, or until the rod 41 abuts against the by-pass 37, the weighing mechanism continuing its descending movement although the valve V is held.

Any suitable means may be employed for closing the valve, such as the weight 42' at the end of the arm 43, the hub 44 of which is secured to the projecting pivot 36. The arm 43 has pivoted thereto the rod 45, the free end of which bears against the inner end of the shiftable lever or valve-actuator 46, pivoted near the inner end of the beam B and practically forming a continuation thereof, whereby as the latter descends during the first part of the operation the valve V cannot close too quickly.

It will be evident that when the advancing movement of the stream-controller or valve is intercepted by the by-pass stop the actuator 46 will move away from the rod 45. On the return stroke of the actuator or counterweighted lever 46 it will impart a thrust to the rod 45 for forcing the valve V open.

The load-reducing means embodies as a part thereof the auxiliary load-receiver G', to which reference has hereinbefore been made, and a valve V', reciprocatory across the discharge-outlet of said auxiliary receiver. The inlet of the auxiliary load-receiver G' is situated below the discharge-orifice of the hopper H, whereby the auxiliary receiver G' will be filled with material before the receiver G is filled, and the overflow from the receiver G' will pass into the receiver G through the outlet 50 near the upper end of said receiver G, the surplus delivered by the overloading means being removed or withdrawn from the auxiliary receiver.

In connection with the weighing mechanism a suitable receptacle is provided for receiving the surplus, such a receptacle being shown at R, and it is movably mounted. The receptacle R has a plurality of chambers, one of which is intended to receive the surplus, and it is oscillated in one direction by the weighing mechanism, preferably to bring one of its compartments into position to receive the surplus, and in the opposite direction by an independent device.

The surplus-receiving receptacle R is situated below the auxiliary receiver G' to catch the material gravitating therefrom when the valve V', constituting a part of the load-reducing means, is opened.

The surplus-receiving receptacle R is supported by the semicylindrical pan 50 for oscillation, said pan constituting a convenient cut-off for the several chambers or compartments of the receptacle, the pan being suitably secured to the upper end of the standard 51 on the base 2. The receptacle R has the oppositely-disposed pivots or journals 52 and 52' working in suitable bearings near the upper end of the semicylindrical pan or cut-off 50.

The compartments 53 and 54 are separated by the longitudinal partition 55, the compartment 53 being intended to receive the surplus, as illustrated in Fig. 6, or when the receptacle has reached the limit of its rearward shifting movement, at which time the outlet of the compartment 53 is covered by the solid portion of the cut-off or pan 50.

Means preferably operative with the weighing mechanism are provided for actuating the receptacle R to bring the compartment 53 into position to receive the surplus removed from the weighing mechanism during the weighing of a load, it being understood that the valve V' is simultaneously opened to permit the surplus to run from the auxiliary load-receiver G'.

The lever 38 has pivoted thereto the link 60, to the lower end of which is pivoted a second link 61, having a bifurcation 62 at its lower end straddling the stop 63 of the actuator 64 of the receptacle. Said actuator consists of a counterweighted lever, the hub of which is suitably secured to the pivot or trunnion 52 of said receptacle and the weight 65 of which rests against a suitable stop, as 66, on the standard 51 during the greater period of operation.

A guide-link is represented at 67, pivoted to the rocker 27 and to the links 60 and 61, respectively, whereby the link 61 is maintained in a predetermined path during the descent of the weighing mechanism. The link 67 terminates in a cam or stop 68, the working face 69 of which coöperates with the valve V' to hold it in its shut position during the overloading period, whereby the material cannot escape from the receiver or conduit G'.

The valve V', which is pivoted at 70' to the receiver G', has an upright arm 70, provided with a projection 71, coöperative with the working face 69 of the cam, these parts being in contact during the overloading period, whereby the valve V' is held shut and against the action of the valve-opening actuator 72, the latter consisting of a counterweight secured to the rock-arm 73 of the valve.

When the overloading or main valve V is wide open, as shown in Fig. 2, the full volume of the supply will flow into the empty load-receiver G and cause the same at a certain point to descend, thereby permitting the valve V to close slightly until the rod 41 abuts against the by-pass stop 37. As the load-receiver descends the poising end of the beam B will move therewith, thereby pulling the rod 40, and consequently the links 60 and 61 and the cam 68, downward, this action continuing until the by-pass 37 goes below the rod 41, as shown in Fig. 3, at which time the valve V can be closed by the dropping of the weight 42' to cut off the supply from the hopper H.

At about the time the valve V has cut off the supply the overrun-face 74 of the cam will have reached a point opposite the roll 71, thereby releasing the auxiliary valve V', so that it can be swung open by the counterweight 72, as represented in Fig. 3. During this period of the operation the link 61, by being thrust downward, will force the left-hand arm of the lever 64 downward, thereby elevating the weighted arm of said lever and simultaneously swinging the receptacle R, the motion continuing until the compartment or chamber 53 of said receptacle is below the outlet of the auxiliary receiver G', as represented in Fig. 6, so that the valve V' having been opened the surplus from the weighing mechanism can flow into the compartment 53, thereby lightening the load-receiver and causing the same to rise, the cam 68 of course moving therewith and the roll 71 leaving the overrun-face 74 of the cam and entering the working face 69 thereof the valve V' will be closed, this operation being completed when the surplus has been removed from the load-receiver.

Means are provided for holding the receptacle R in its several shifted positions, in one of which it is adapted to receive the surplus, said means consisting of the gravity-latch 80, pivoted at 81 to the arm 82 of the cut-off 50. The latch 80 is of angular form, it being limited in its motion by the stop 83 on the rock-arm 84, movably mounted on the pivot 81. The stop-arm 84 is pivoted at its upper end to the link 85, the latter being similarly attached to the rock-arm 86 on the transverse rock-shaft 28.

It will be evident that when the receptacle R is operated to bring the compartment 53 into position to receive the surplus the wall 53' of the receptacle will impinge against the working-arm of the latch and lift the same, following which said working arm will drop behind said wall, as illustrated in Fig. 3, to hold the receptacle, and consequently the actuator therefor, in their shifted positions.

It will be remembered that a latch L' has been described for holding the closer L shut, said latch being situated to engage the slide 25. The tripper for the latch is designated by T, and it consists of a by-pass of ordinary construction, the hook portion 87 of which is normally located above the weighted arm of the latch, as represented in Fig. 2, the action of the by-pass tripper T, which is pivoted at 88 to the reciprocatory rod 40, being limited by the stop 89 on the tripper, which normally bears against the rod. As the load-receiver descends the tripper will be thrust to one side by the latch L', but on the ascent of the parts and when all the surplus has been withdrawn from the weighing mechanism the hook 87 of the tripper will lift the weighted arm of the latch and disengage the shouldered arm 33 thereof from the offset 34 of the slide, whereby the closer is released and forced open or downward by the pressure of the mass in the load-receiver.

As the closer is opened the rocker 86 will be swung about its center, thereby slightly elevating the link 85 and throwing the arm 84 to a vertical position, so that the stop 83, by acting against the latch 80, will lift the same and disengage it from the wall 53' of the receptacle, succeeding which the latch will drop and the weight 65 will fall, thereby moving the receptacle R until the partition 55 abuts against the working arm of the latch 80, as represented in Fig. 4, the chamber or compartment 54 during this operation being brought into line with the auxiliary load-receiver G' by the dropping of the weight 65, as shown in Fig. 7.

The cam 68 on the opening of the closer will be moved away from the coöperating roll 71, as represented in Fig. 4, thereby releasing the valve V' so that it can be opened by the falling of its actuator 72 to permit the material within the auxiliary load-receiver to pass into the compartment or chamber 54 of the receptacle R. The material from the auxiliary load-receiver will then flow through the outlet 90 of the cut-off and from thence into the spout 91 on the load-receiver, as shown in Fig. 7, such material forming part of the predetermined load and passing through the discharge-outlet of the load-receiver as it leaves the spout 91.

When the predetermined charge has passed from the load-receiver, the closer L will be shut and rotated in the manner hereinbefore set forth, and as it shuts the working face 69 of the cam 68 will be forced against the roll 71 of the valve V', thereby shutting the latter, and the arm 84, by reason of its connection with the rocker 86, will be caused to assume a vertical position, whereby the stop 83, by acting against the latch 80, will lift said latch above the partition 55, thereby freeing the receptacle, so that the weight 65 can drop to move the receptacle R to bring the chamber 53 thereof opposite the outlet 90 of the cut-off, the closer L in the interim having been locked in its shut position, whereby the material in the chamber 53 can pass through said outlet into the spout 91 and from thence into the empty load-receiver to form the first part of the succeeding load.

In connection with the supply and discharge mechanism reciprocally-effective stops are provided, the slide 25, to which reference has hereinbefore been made as mounted on the load-receiver, constituting one of said stops, the coöperating stop being designated by 95 and consisting of a skeleton or open segment suitably secured to the projecting trunnion 35 of the valve. The operation of these coöperating stops is illustrated clearly in Figs. 2 and 4.

In Fig. 2 the upper end or roll 96 of the stop or slide 25 is illustrated in contact with the curved face 97 of the stop 95, whereby the stop 95 will positively block the ascending movement of the slide or stop 25 should the latch L' be tripped too quickly, so that the closer L cannot be prematurely opened, this relation continuing so long as the valve V is open. When the valve V is shut and when the closer is opened, as represented in Fig. 4, the slide 25 will be thrust upward behind the stop 95 with the roll 96 substantially in contact with the face 98 of said stop 95, thereby to hold the latter, and consequently the valve V, against retractive movement while the load is being discharged. When the closer shuts, the slide 25 is drawn downward across the plane of the curved face 97, thereby releasing the stop 95, and hence the valve.

In Fig. 8 I have illustrated a means for weighing out loads of different quantities, the weight W of the beam B having suitably secured to one end thereof the auxiliary beam B″, which in practice may be graduated as shown and described in Letters Patent No. 548,839, granted to me October 28, 1895. The beam B″ is in the form of a rack, the teeth of which are designated by 100 and carries for sliding movement the load-weight W′, consisting of two sections or disks 101 and 102, one of which, or the disk 101, being furnished with the spindle or stud 103, provided at a suitable point with the pinion 104, meshing with the teeth 100 of the auxilary beam B″, said spindle also passing through the disk 102.

A clamp is shown at 105, consisting of a nut or collar in threaded engagement with the spindle or stud 103, said nut being adapted to bind against the outside face of the disk 102 to hold the weight W′ in an adjusted position. To move the weight W′ along the auxiliary beam B″, it is simply necessary to unloosen the nut 105, when the same can be rolled therealong, and when it has reached the proper position the nut can be tightened.

The operation of the hereinbefore-described machine, briefly set forth, is as follows: Fig. 2 represents the positions occupied by the various parts at the commencement of operation, the closer L being shut and held in such position by the latch L′, which is in engagement with the slide 25, and the valve V being wide open a stream of large volume will enter the empty load-receiver. When a certain quantity of material has been received by the latter, it, with the poising end of the beam B, will descend, so that the inner end of the actuator 46 will move away from the rod 45, thereby permitting the valve V to close or until the valve-rod 41 abuts against the by-pass stop 37. As the beam B continues to descend the rod 40 will be drawn downward, the by-pass 37 being moved in a corresponding direction and being caused to pass below the free end of the rod 41 when the load-receiver is overloaded, so that the valve V is released and can be promptly closed by the dropping of the counterweight 42. As the weighing mechanism descends the links 60 and 61 are being thrust downward, thereby oscillating the receptacle R, so that when the load-receiver is overloaded the said receptacle will have reached the position shown in Fig. 3, with the compartment 53 opposite or in line with the outlet of the auxiliary load-receiver G′, in which position the receptacle is held by the gravity-latch 80. As the two links 60 and 61 are thus thrust downward the working face 69 of the cam 68 will be caused to ride along the roll 71 of the auxiliary valve V′ until the overrun-face 74 of said cam is opposite said roll, as shown in Fig. 3, at which time the auxiliary valve V′ can be swung open by the counterweight 72 to permit the surplus to pass from the auxiliary receiver G′. When the load-receiver reaches the limit of its downward movement, the by-pass tripper T on the rod 40 will have been carried to a point below the weighted arm on the latch L′, so that on the upstroke of the parts and when the surplus has been fully withdrawn from the load-receiver the latch L′ will be tripped to release the closer L, so that it can be forced open. As the closer L opens the cam 68, which is connected with the closer, will be moved away from the roll 71, the valve V′ having been closed, and the latch 80, by reason of its connection with the closer, will be also raised to release the receptacle R and to permit it to be swung about its center to the position shown in Fig. 4, so that the material from the auxiliary load-receiver G′ can pass through the chamber 54 of the receptacle and into the spout 91, such material being discharged with the remainder of the load through the outlet of the load-receiver. When the material has been completely discharged from the load-receiver, the closer L will be shut and the several parts of the weighing mechanism will be returned to their initial positions to repeat the operation.

Having described my invention, I claim—

1. The combination, with weighing mechanism including a load-receiver, of overloading and load-reducing means; a movably-mounted receptacle having a plurality of compartments; and means for actuating said receptacle to bring one of the compartments thereof in position to receive the surplus removed from the load-receiver.

2. The combination, with weighing mechanism including a load-receiver, of overloading and load-reducing means; a movably-mounted receptacle having a plurality of compartments; a cut-off for said receptacle; and means for actuating said receptacle to bring one of the compartments thereof into position to receive the surplus removed from the load-receiver.

3. The combination, with weighing mechanism including a load-receiver, of overloading and load-reducing means; a movably-mounted receptacle having a plurality of compartments; a stationary cut-off for said receptacle; and means for actuating the latter to bring one of its compartments in position to receive the surplus removed from the load-receiver.

4. The combination, with weighing mechanism including a load-receiver, of overloading and load-reducing means; an oscillatory receptacle having a plurality of compartments; and means for actuating said receptacle to bring one of the compartments thereof in position to receive the surplus removed from the load-receiver.

5. The combination, with weighing mechanism including a load-receiver, of overloading and load-reducing means; a movably-mounted receptacle having a plurality of compartments; and means controlled by the weighing mechanism for actuating said receptacle to bring one of the compartments thereof in position to receive the surplus removed from the load-receiver.

6. The combination, with weighing mechanism including a load-receiver, of overloading and load-reducing means; a movably-mounted receptacle having a plurality of compartments; means controlled by the weighing mechanism for swinging said receptacle in one direction; and an independent device for oppositely swinging said receptacle.

7. The combination, with weighing mechanism including a load-receiver, of overloading and load-reducing means; a movably-mounted receptacle having a plurality of compartments; and a cut-off for said receptacle, having an outlet.

8. The combination, with weighing mechanism including a load-receiver, of overloading and load-reducing means; a movably-mounted receptacle having a plurality of compartments; a stationary cut-off for said receptacle, carried by the framework and adapted to support said receptacle; and means for operating the latter to bring one of the compartments in position to receive the surplus removed from the load-receiver.

9. The combination, with weighing mechanism including a load-receiver, of overloading and load-reducing means; a movably-mounted receptacle having a plurality of compartments; means controlled by the weighing mechanism for swinging said receptacle in one direction; and a counterweight connected with said receptacle for oppositely swinging the same.

10. The combination, with weighing mechanism including a load-receiver, of overloading and load-reducing means; a movably-mounted receptacle having a plurality of compartments; means controlled by the weighing mechanism for swinging said receptacle to bring one of the compartments thereof in position to receive the surplus removed from the weighing mechanism; and a counterweighted lever connected with said receptacle for swinging the same in the opposite direction.

11. The combination, with weighing mechanism including a load-receiver, of overloading and load-reducing means; a movably-mounted receptacle having a plurality of compartments; means controlled by the weighing mechanism for shifting said receptacle; and a latch adapted to hold the receptacle in its shifted position.

12. The combination, with weighing mechanism including a load-receiver, of overloading and load-reducing means; a movably-mounted receptacle having a plurality of compartments; means controlled by the weighing mechanism for shifting said receptacle; a gravity-latch in position to hold the receptacle in its shifted position.

13. The combination, with weighing mechanism including a load-receiver, of overloading and load-reducing means; a movably-mounted receptacle having a plurality of compartments; means controlled by the weighing mechanism for shifting said receptacle; and a latch connected with the closer, for holding said receptacle in its shifted position.

14. The combination, with weighing mechanism including a load-receiver, of overloading and load-reducing means; a movably-mounted receptacle having a plurality of compartments; means for shifting the receptacle to bring one of the compartments thereof in position to receive the surplus removed from the weighing mechanism, and for also imparting a return movement thereto; and a latch adapted to hold the receptacle in its successive shifted positions.

15. The combination, with weighing mechanism including a load-receiver, of overloading and load-reducing means; an oscillatory receptacle having a plurality of compartments; a device connected with the receptacle for shifting the same; and means connected with the weighing mechanism for engaging said device.

16. The combination, with weighing mechanism including a load-receiver, of overloading and load-reducing means; a pivotally-supported receptacle having a plurality of compartments; a counterweighted lever fixed to a pivot of the receptacle; and means connected with the weighing mechanism for engaging said lever to shift the receptacle.

17. The combination, with weighing mechanism including a load-receiver, of overloading and load-reducing means; a movably-mounted receptacle having a plurality of compartments; means controlled by the weighing mechanism for shifting said receptacle to bring the same in position to receive an overload, and for also imparting a return movement thereto; and a spout on the load-receiver, situated below said receptacle.

18. The combination, with weighing mechanism including a load-receiver, of overloading and load-reducing means; an oscillatory receptacle having a plurality of compartments; and means for actuating said receptacle during the weighing of a load to bring the respective compartments in position to receive the material removed from the load-receiver.

19. The combination, with weighing mechanism including a load-receiver carrying an auxiliary load-receiver; of means for delivering an overload, portions of which are supplied to the respective load-receivers; means for removing material from the auxiliary load-receiver during the weighing of a load; an oscillatory receptacle having a plurality of compartments; and means for actuating the receptacle during the weighing of a load to bring the respective compartments in position to receive the material removed from the auxiliary load-receiver.

20. The combination, with weighing mechanism including a load-receiver, of an auxiliary valved load-receiver carried thereby;

means for delivering an overload, parts of which are supplied to the respective load-receivers; means for operating the valve, during the weighing of a load, to effect the removal of material from the auxiliary load-receiver; an oscillatory receptacle having a plurality of compartments; and means for actuating the receptacle, during the weighing of a load, to bring the respective compartments in position to receive the material removed from the auxiliary load-receiver.

21. The combination, with weighing mechanism including a load-receiver having a closer, of overloading and load-reducing means, the load-reducing means including a valve; and a cam connected with the closer and adapted to hold said valve in its shut position during the supply of the overload and to be moved away from the valve on the opening of the closer.

22. The combination, with weighing mechanism including a load-receiver, of overloading and load-reducing means, the load-reducing means embodying a valve; a rocker; and a cam connected with the rocker and operable to hold the valve in its shut position during the supply of an overload, the rocker being operated on the discharge of the load whereby the cam will be moved away from the valve to permit the latter to open.

23. The combination, with weighing mechanism including a load-receiver provided with a closer, of overloading and load-reducing means, the load-reducing means embodying a valve; a rocker on the load-receiver connected with the closer; and a cam in position to hold the valve shut during the supply of the overload and to be moved away from the valve by the closer, as it opens, acting through said rocker.

24. The combination, with a load-receiver and a supporting scale-beam therefor, of a closer for the load-receiver; overloading and load-reducing means, the load-reducing means embodying a valve; and a cam in position to hold the valve shut during the supply of the overload, said cam being connected, respectively, with the scale-beam and the load-receiver.

25. The combination, with weighing mechanism including a load-receiver provided with a closer; of overloading and load-reducing means, the load-reducing means embodying a valve; a cam in position normally to hold the valve shut; an oscillatory receptacle having a latch; and connections between the cam and the latch and the closer, respectively.

26. The combination, with weighing mechanism including a load-receiver, of a closer supported for bodily reciprocatory movement relatively to the load-receiver; and means for rotating the closer, to present its edge to the discharging mass, on one of its strokes.

27. The combination, with weighing mechanism including a load-receiver, of a closer-plate supported for bodily reciprocatory movement relatively to the load-receiver; and means for rotating said closer-plate, to present its edge to the discharging mass, on one of its strokes.

28. The combination, with weighing mechanism including a load-receiver, of overloading and load-reducing means, the load-reducing means embodying a counterweighted valve having a projection; a cam in position to hold the valve shut during the supply of an overload; and means for moving the cam away from the projection on the discharge of the load.

29. The combination, with weighing mechanism including a load-receiver provided with a closer supported for bodily reciprocatory movement toward and from the load-receiver; and pawl-and-ratchet mechanism for imparting a step-by-step movement to the closer, to present its edges alternately to the discharging mass.

30. The combination, with weighing mechanism, of overloading and load-reducing means; a movably-mounted surplus-receiving receptacle; means for shifting said receptacle during the weighing of a load; and a latch for holding it in its shifted position.

31. The combination, with weighing mechanism including a load-receiver provided with a closer having trunnions, of arms attached to the load-receiver and having bearings to receive said trunnions; a ratchet secured to one of the trunnions; and a pawl connected with the load-receiver, for engaging said ratchet.

32. The combination, with weighing mechanism including a load-receiver, of a closer supported for bodily reciprocatory movement relatively to the load-receiver; and means for rotating the closer, on its opening and shutting movements, respectively, alternately to present its edges to the discharging mass.

33. The combination, with weighing mechanism including a load-receiver, of a closer supported for bodily reciprocatory movement relatively to the load-receiver and flattened at its opposite ends; and means for rotating the closer.

34. The combination, with weighing mechanism including a load-receiver, of a closer therefor flattened on one end; and means for operating the closer to present it in an edgewise position to the discharging stream of material from the load-receiver.

35. The combination, with weighing mechanism including a load-receiver provided with a closer having trunnions, of arms attached to the load-receiver and having bearings for receiving said trunnions; a ratchet secured to one of the trunnions; arms loosely mounted on the trunnions carrying the ratchet, said arms being connected with the load-receiver; and pawls carried by said arms and in position to engage the ratchet.

36. The combination, with weighing mechanism including a load-receiver having a closer; a rocker mounted on the load-receiver and connected with the closer; a slide having an offset portion and connected with said rocker by a link; a latch in position to engage said offset portion; a stream-controller; and a stop connected with said stream-controller and adapted to coöperate with said slide.

FRANCIS H. RICHARDS.

Witnesses:
F. N. CHASE,
ANDREW FERGUSON.